May 20, 1958
H. W. CREAGER
2,835,415
HOT FLUID DISPENSER
Filed April 12, 1956
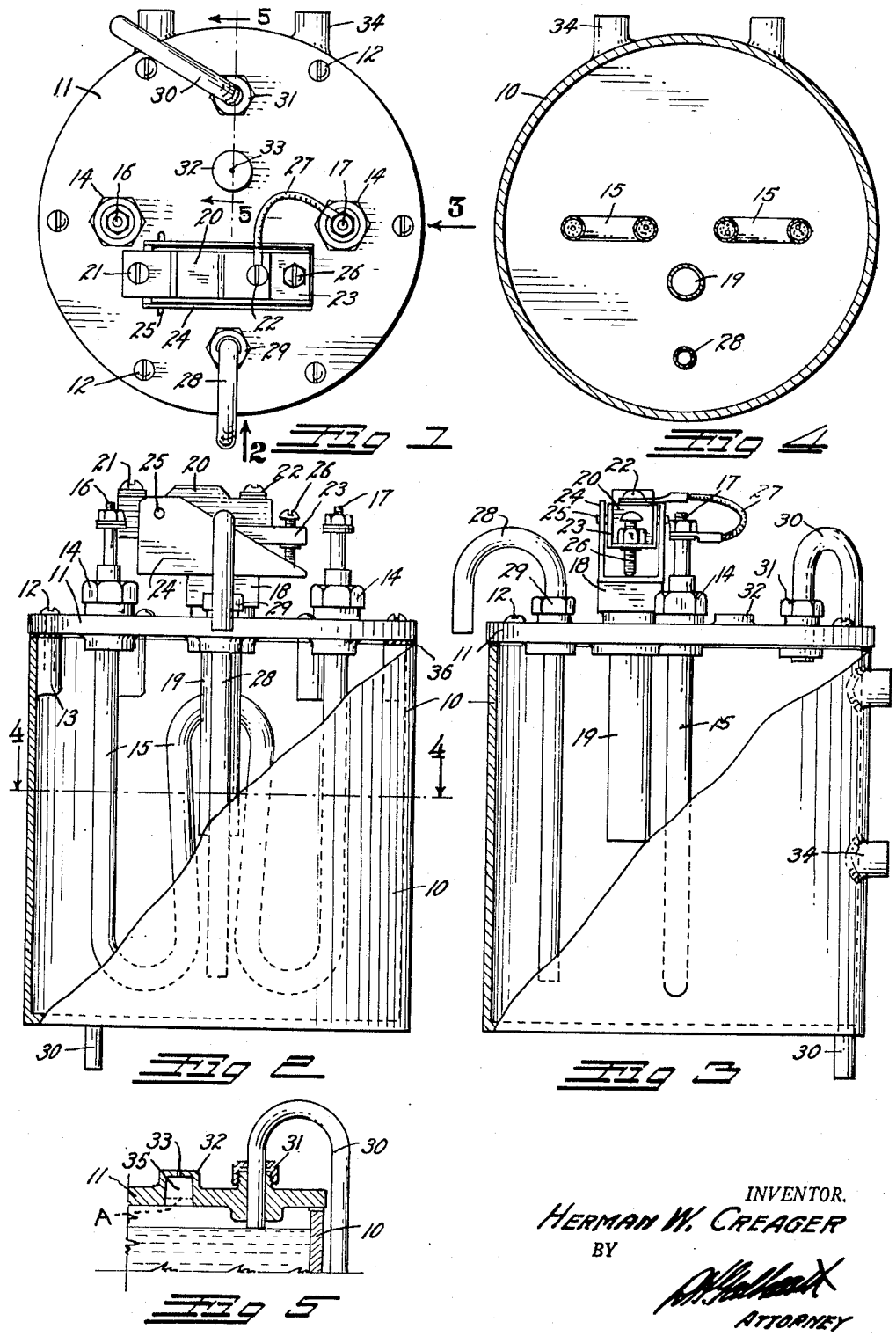
INVENTOR.
HERMAN W. CREAGER
BY
ATTORNEY

United States Patent Office 2,835,415
Patented May 20, 1958

2,835,415

HOT FLUID DISPENSER

Herman W. Creager, Denver, Colo., assignor to Superior Manufacturing Corporation, Denver, Colo.

Application April 12, 1956, Serial No. 577,857

2 Claims. (Cl. 222—204)

This invention relates to an electrically energized fluid heater, and more particularly to a water heating and dispensing device for use in coin-actuated beverage dispensing machines. Machines of this character place a premeasured amount of powdered material, such as powdered coffee, in a container and then cover the powdered material with a predetermined amount of water having a temperature slightly below the boiling point. The present invention relates to a device for heating and delivering the predetermined amount of heated water in such a machine.

The principal object of the invention is to provide a highly efficient, compact water heating device which will constantly maintain a measured quantity of water at a desired temperature, and from which a measured amount of hot water will be discharged when an equal amount of cold water is admitted and to so construct the device that the delivered hot water will be dispensed from the top or hot-test zone of the device and the incoming water will be delivered to the bottom or coolest zone of the device.

Other objects and advantages reside in the detail construction of the invention, which is designed for simplicity, economy, and efficiency. These will become more apparent from the following description.

While a specific form of the improvement has been described and illustrated herein, it is desired to be understood that the same may be varied, within the scope of the appended claims, without departing from the spirit of the invention.

In the drawing:

Fig. 1 is a plan view of the improved water heating device;

Fig. 2 is a side view of the improved device, looking in the direction of the arrow 2 in Fig. 1, partially broken away to show the interior construction;

Fig. 3 is a similar view, looking in the direction of the arrow 3 in Fig. 1;

Fig. 4 is a horizontal cross-section, taken on the line 4—4, Fig. 2; and

Fig. 5 is a detail sectional view, taken on the line 5—5, Fig. 1.

The improved water heating device employs a cylindrical, open-topped bowl or container 10 preferably, but not necessarily, formed from cast aluminum. The open top of the container 10 is closed by means of a cap plate 11 which is secured to the container 10 against a suitable sealing gasket 36 by means of cap screws 12 which enter internally threaded bosses 13 cast within the container. The container 10 is provided with suitable internally threaded attachment lugs 34 by means of which it may be attached to any suitable wall or other support within a coin-actuated beverage dispensing device.

The two extremities of a tubular electrical heating element 15 extend upwardly through the cap plate 11 and are sealed thereto by means of threaded compression caps 14. The element 15 is of a conventional immersion heater type, such as a "Calrod," and is provided with two terminal binding posts 16 and 17 through the medium of which current is furnished to the element 15. The element is convoluted, as shown in Fig. 2, with two downwardly extending convolutions on each side of a medial upwardly extending convolution, so as to obtain a maximum length of heating element within the container 10.

A thermostat bushing 18 extends through and is sealed to the cap plate 11 and supports an expansible fluid thermostat tube 19 within the container 10. The thermostat tube 19 is of a conventional variety designed to force a plunger upwardly as the temperature of the tube 19 increases. The upwardly moving plunger contacts and actuates the actuating button of a suitable micro-switch 20 to open the circuit between two connecting screws 21 and 22 with which a conventional micro-switch is provided.

The micro-switch 20 is mounted on a tilting plate 23 which is tiltably mounted in a U-shaped yoke frame 24 upon a suitable pivot member 25. The yoke frame 24 is permanently mounted on the bushing 18, and the tilting plate 23 is adjustably supported thereon from a set screw 26. By screwing the set screw 26 downwardly, the micro-switch will be raised so that it will require a greater movement of the actuating plunger of the thermostat tube and a greater actuating temperature to cause the switch to break the circuit. One of the connecting screws 21 is connected to a source of electricity. The other connecting screw 22 is connected by means of a flexible conductor 27 with the terminal 17 of the heating element 15. The other terminal 16 of the heating element is connected to the source of electricity.

An inverted J-shaped intake tube 28 passes through the cap plate 11 and is sealed therein by means of a suitable compression nut 29. The longer leg of the intake tube extends downwardly within the container 10, terminating adjacent the bottom thereof. A similar J-shaped discharge tube 30 extends through the cap plate 11 and is sealed thereto by means of a suitable compression nut 31. The longer leg of the discharge tube extends downwardly alongside the exterior of the container 10 and terminates below the bottom thereof. A hollow boss 32 is cast on the cap plate 11 to form an air pocket 35 therein, and an exceedingly small breather port 33 approximately .025 inch in diameter is drilled through the boss 32.

In a beverage dispensing machine, the intake tube 28 is connected to a source of premeasured fluid and the discharge tube 30 is arranged to discharge into a beverage mixing container.

Let us assume that the container 10 is filled with water up to the level of the inner extremity of the tube 30, as shown in Fig. 5, that the heating element 15 is energized and that the set screw 26 has been regulated to cause the micro-switch 20 to open the electric circuit at 200° F. It can be seen that when the temperature of the water reaches the preset point, the circuit will open and when the temperature drops below this point the circuit will close so that the temperature is maintained within a variation of very few degrees. Any vapors produced will discharge through the breather port 33.

Now let us assume that one cup of cold water is rapidly introduced through the intake tube 28. This cold water is delivered to the bottom zone of the container 10 and rapidly raises the level of the water therein. Since the volume per time unit of the incoming water exceeds the capacity of the breather port 33, air will be compressed in the top of the container as the water level rises therein. When the water level rises to a predetermined point, for instance as indicated by the broken line "A" in Fig. 5, the pressure on the air will exceed the pressure necessary to lift the water over the bend in the discharge tube and a siphon action will be started in the latter tube. This siphon action will rapidly draw water from the container, the water being replaced by expansion and by air sucked inwardly through the breather port 33, until the water level returns to the normal position, as indicated at "B" in Fig. 5, at which time the siphon will be broken by air entering the bottom of the short leg of the discharge tube and the discharging flow will be instantly stopped.

Thus, it can be seen that the heating element is maintained completely surrounded by water at all times; that the amount of hot water delivered will be exactly equal to the amount of cold water which has been introduced into the container; and that the hot water is taken from the top of the volume of water the temperature of which is unaffected by the incoming measured quantity of cold water.

While a specific form of the improvement has been described and illustrated herein, it is desired to be understood that the same may be varied, within the scope of the appended claims, without departing from the spirit of the invention.

Having thus described the invention, what is claimed and desired to be secured by Letters Patent is:

1. A device for containing and dispensing a fluid comprising: a bowl-like container; a cap member closing the top of said container; a siphon tube having a long and a short leg, said short leg extending through said cap and downwardly into said container to the normal fluid level therein, said long leg extending downwardly alongside said container to a point below the fluid level therein; a continuously open breather port communicating through said cap; and an intake tube extending through and sealed to said cap member and terminating in close spaced relation to the bottom of said container, the cross-sectional area of said intake tube exceeding the cross-sectional area of said breather port so that fluid can be introduced into said container through said intake tube more rapidly than air can discharge through said breather port so as to create sufficient air pressure in said container to initiate a siphon action through said siphon tube.

2. A device as described in claim 1 having a hollow boss formed on said cap plate and extending upwardly therefrom, the top of said boss being closed, the bottom of said boss being open to the interior of the container to form an air pocket thereover, said breather port being formed in the closed top of said boss so that fluid may rise above said cap plate to compress air in said air pocket so that said air will escape under pressure through said continuously open breather port.

References Cited in the file of this patent

UNITED STATES PATENTS

| | | |
|---|---|---|
| 687,395 | Douglas | Nov. 21, 1901 |
| 1,289,620 | Bird | Dec. 31, 1918 |
| 2,569,486 | Mills | Oct. 2, 1951 |
| 2,660,351 | Thompson | Nov. 24, 1953 |